United States Patent
Honea

[11] 3,978,990
[45] Sept. 7, 1976

[54] MOBILE LOG SKIDDER

[76] Inventor: Thomas H. Honea, 11258 Slater Ave. NE., Kirkland, Wash. 98033

[22] Filed: July 12, 1974

[21] Appl. No.: 487,902

[52] U.S. Cl.................................. 212/9; 212/7; 212/44; 212/48; 294/106; 294/118; 294/110 R
[51] Int. Cl.².................................. B66C 23/00
[58] Field of Search.................. 214/3, 92, 86 R; 294/106, 110 A, 112, 118; 254/167; 212/41, 42, 43, 44, 7, 9, 55; 144/2 Z, 3 D, 309 R, 309 AC

[56] References Cited
UNITED STATES PATENTS

| | | | |
|---|---|---|---|
| 718,079 | 1/1903 | Bindhammer | 294/110 A |
| 2,801,759 | 8/1957 | Adams | 212/44 |
| 3,268,090 | 8/1966 | Wirkkala | 212/55 |
| 3,308,967 | 3/1967 | Barkley et al. | 212/55 |
| 3,576,202 | 4/1971 | Spanjer | 214/3 |
| 3,781,056 | 12/1973 | Ransford et al. | 294/112 |

Primary Examiner—Robert J. Spar
Assistant Examiner—Lawrence J. Oresky
Attorney, Agent, or Firm—Christopher Duffy

[57] ABSTRACT

The carriage of the skidder is equipped with an elongated boom and a haulback cable, and there are power driven means on the boom for paying out the attachment end of the cable to the site of the logs, and power driven means on the carriage for hauling in the cable after it has been attached to the logs. There are also means on the boom whereby an operator can use the boom to attach the cable to the logs, and/or to transport himself to and from the site of the logs, so that in the alternative, he may attach the cable to the logs. If the boom is used to attach the cable, the pay out means is adapted so that the operator can detach the boom from the cable, and actuate the haul-in operation, from a point adjacent the haul-in means, such as from a point on the carriage. If the operator himself attaches the cable, the boom is adapted so that the operator can detach the cable from the boom, and actuate the haul-in operation, from a point adjacent the site of the logs, such as from a point on the distal end portion of the boom.

21 Claims, 21 Drawing Figures

MOBILE LOG SKIDDER

THE INVENTION IN GENERAL

This invention relates to a mobile log skidder, the carriage of which is equipped with an elongated boom and a haulback cable. There are power driven means on the boom for paying out the attachment end of the cable to the site of the logs, and power driven means on the carriage for hauling in the cable after it has been attached to the logs. There are also means on the boom whereby an operator can use the boom to attach the cable to the logs, and/or to transport himself to and from the site of the logs, so that in the alternative, he may attach the cable to the logs. If the boom is used to attach the cable, the pay out means is adapted so that the operator can detach the boom from the cable, and actuate the haul-in operation, from a point adjacent the haul-in means, such as from a point on the carriage. If the operator himself attaches the cable, the boom is adapted so that the operator can detach the cable from the boom, and actuate the haul-in operation, from a point adjacent the site of the logs, such as from a point on the distal end portion of the boom.

According to the invention, the boom is extensible and retractable, and the carriage has a free-spooling cable winding winch means thereon, which in turn has the haulback cable wound thereabout, independently of the boom. However, there are means on the cable and/or the boom whereby the cable is detachably connectable to an extensible section of the boom, so that the section can also be used to pay out the attachment end of the cable to the site of the logs.

After the end of the cable is at the site of the logs, the cable is detached from the boom and attached to one or more logs, or alternatively, attached to one or more logs and then detached from the boom, depending on the mode of operation which is employed. For example, in one embodiment of the invention, the skidder is equipped with means for lowering and raising the distal end of the boom in relation to the ground, and also with a log engaging grapple which is releasably engaged on the distal end portion of the boom at the attachment end of the cable, and responsive to lowering and raising of the distal end of the boom to alternatively engage a log and disengage from the boom, respectively. In another embodiment, the operator manually detaches the cable from the boom, and then attaches it to one or more logs for the haul-in operation; and in this instance, the distal end portion of the boom has a platform thereon for carrying the operator to the site of the logs, and the skidder is again equipped with means for lowering and raising the distal end of the boom in relation to the ground, to enable the operator to reach the logs for the attachment operation.

In the first mentioned embodiment above, the grapple preferably defines a pair of jaws having an open mouthed recess therebetween, as well as relatively shiftable control means thereon, which are operable to open and close the mouth of the recess. In addition, the grapple includes means which are operative to bias the control means in the direction of opening the mouth of the recess, and means which are operatively interconnected with the haulback cable whereby tensioning the cable causes the control means to close the mouth of the recess. The boom has a pair of yieldably biased pincers on the distal end portion thereof, and the grapple is releasably engaged in the pincers so that the bias of the pincers operates counterdirectionally to the bias on the control means and tends to close the mouth of the recess. However, the jaws have a log engaging trigger thereon which is operative to open the mouth of the recess against the bias of the pincers, but which is also displaceable in relation to the jaws by a log disposed in the mouth of the recess, so that the mouth is closed by the bias of the pincers and the log is engaged by the grapple to the extent that the weight of the log can be used to disengage the grapple from the boom when the distal end of the boom is raised in relation to the ground.

For example, the jaws may be defined by a pair of relatively pivotally interconnected tongs which have bell-crank-like control levers on the pivotally interconnected ends thereof, the relatively free ends of which are pivotally interconnected with the attachment end of the haulback cable. Preferably, the levers are also coaxially hinged to the pivotally interconnected ends of the tongs, so as to be rotatable in and out of the plane of the tongs. The biasing means may take the form of a mechanical servo mechanism such as a coiled spring which is caged between the levers in the crotch thereof, to bias the levers in the direction of opening the mouth of the tongs; or they may take the form of a hydraulically or pneumatically operated servo mechanism such as a hydraulic cylinder which is pivotally interconnected between the levers in the crotch thereof, to bias the levers in the same fashion, and in addition, to be employed in opening the mouth of the tongs where it is desired to collect more than one log at the carriage before the boom is retracted. Alternatively, a second haulback cable may be Y-connected with the tongs to open the mouth thereof for this purpose.

The pincers may take the form of a pair of spring loaded dogs which are mutually opposed to one another on a side or tip of the boom to receive the grapple therebetween.

The trigger may take the form of a bar, one end of which is pivotally interconnected with one of the tongs by a universal joint, and the other end of which is releasably engageable with the other tong in such a way that the bar is disengageable from the other tong by a log interposed in the recess adjacent the mouth thereof.

In the second mentioned embodiment above, the winch means is power driven by means which include electrically actuatable control means, and the distal end portion of the boom has a manually operable actuator means thereon which is electrically interconnected with the control means along the length of the boom to enable the control means to be actuated from a point on the distal end portion of the boom, such as at a point adjacent the platform for the operator. The means whereby the cable is detachably connectable to the extensible section of the boom, includes any one of a variety of releasable fastening means, such as hooks about which the sliding bells of the choker lines of a conventional haulback cable can be detachably secured. Preferably, a plurality of hooks is employed so that the choker lines can be sorted at the same time by hanging each bell about a separate hook.

According to another feature of the invention, the boom is power driven by means which include electrically actuatable control means, and the distal end portion of the boom has an additional manually operable actuator means thereon which is electrically interconnected with the boom drive control means along the length of the boom to enable the latter control means to be similarly actuated from a point on the distal end portion of the boom, such as at a point adjacent the platform for the operator. In this way, the operator can transport himself to the site of the logs while the boom is paying out the cable, and then after he has detached the cable from the boom, and attached it to the logs, he can use the actuator means on the boom to actuate both the winch drive means and the boom drive means, to return himself to the carriage on the boom while the cable is being hauled in.

Preferably, the control means for the winch drive means and the control means for the boom drive means, are also actuatable by bypass controls on the carriage itself.

In either embodiment, the boom may be pivotally mounted on the carriage to be swung up and down in a vertical plane, and the carriage may be equipped with drive means for swinging it in such a plane. Or in the alternative, the carriage may be in two parts or sections which are relatively pivotally interconnected with another and have separate axled ground engaging elements thereon; and the sections may also be interconnected by drive means for swinging them in relation to one another about the axles of the elements, to raise and lower the distal end of the boom. For example, in the latter instance, the parts or sections of the carriage may be interconnected by an articulated draft connection having a universal joint therein, and an extensible and retractable servo mechanism may be interposed between the sections at a point spaced above or below the draft connection to generate opposing moments in the sections about the axles of the ground engaging elements, when the servo mechanism is extended or retracted. Preferably, the servo mechanism takes the form of a double-acting hydraulic or pneumatic cylinder which is pivotally interconnected between the sections above the draft connection.

Furthermore, in either embodiment, the boom may be supported in a generally horizontal disposition on the carriage at a first point operatively adjacent the proximal end of the boom, and an extensible and retractable truss may be provided for supporting the boom at a second point thereon interposed between the first point of support and the distal end of the boom. Preferably, the truss comprises a mast which is mounted on the boom to be reciprocated between a relatively extended position in which the top of the mast is elevated to a point substantially above the boom, and a relatively retracted position in which the top of the mast is withdrawn to a point substantially adjacent the boom. The mast has fairleader means thereon adjacent the top thereof, and the boom has a reel thereon adjacent the proximal end thereof. A flexible pendant is wound on the reel and extends through the fairleader means to and in attachment with the aforesaid second point of support for the boom. In addition, there are means for reciprocating the mast to and from the respective positions thereof, and means for applying tension to the pendant when the mast assumes the relatively extended position thereof.

Preferably, the mast is pivotally mounted on the boom to swing between the relatively extended and retracted positions thereof, and the tension applying means also operate to apply tension to the pendant when the mast is in the relatively retracted position thereof. Additionally, there are means on the boom which form a groove in the top thereof for receiving the pendant in the relatively retracted position of the mast.

Preferably, the boom is multisectioned and the reel is mounted on the relatively stationary parent section thereof. Moreover, the second point of support for the boom preferably includes a dog which is pivotally mounted on the parent section or one of the relatively extensible and retractable sections of the boom, and responsive to the tension in the pendant to engage the next successive section of the boom in the direction of the distal end thereof, and interlock the respective sections with one another, when the mast assumes the relatively extended position thereof. Where the dog is mounted on an extensible and retractable section, normally another dog is pivotally mounted on the present section and interconnected with the pendant by a flexible tie-line so as to engage the next successive section of the boom in the direction of the distal end thereof, and interlock the respective sections, when tension is applied to the pendant in the relatively extended position of the mast.

The reel is preferably torsion loaded to apply tension to the pendant when the mast assumes the relatively extended position thereof, and to be self-winding when the mast is withdrawn to the relatively retracted position thereof. Also, the additional dog preferably has a smaller torsion-loaded reel thereon with which the tie-line is connected so that the latter reel applies tension to the line in the relatively extended position of the mast, and self-winds the line thereon when the mast is withdrawn to the relatively retracted position thereof.

In each embodiment of the invention, it is also preferred to employ a boom which is equipped with a winch driven dual cable and pulley drive system for extending and retracting the extensible section or sections of the boom in response to haul-in of the respective cables thereof. Moreover, in the second mentioned embodiment above, the electrical interconnection between the actuator means and the boom drive control means is preferably carried on the winch means of the boom drive system.

BRIEF DESCTIPTION OF THE DRAWINGS.

These features will be better understood by reference to the accompanying drawings which illustrate the invention with respect to the foregoing embodiment thereof.

In the drawings.

DESCRIPTION OF THE PREFERRED EMBODIMENTS

Referring to FIGS. 1–5 of the drawings, it will be seen that the carriage 2 of the tractor 4 has a canopy frame 6 erected above the driver's seat 8 thereof, and the frame 6 in turn has a platform 10 supported thereacross, which in turn has a pedestal 12 raised in the middle thereof. The pedestal 12 serves as a base for a motor-driven turntable 14 which has a telescopic boom 16 supported at the center thereof. The boom 16 is generally horizontal in orientation, but is pivotally mounted on the turntable so that it can be swung up and down through approximately 30° or so. The pivotal motion is generated by a pair of hydraulic cylinders 18 which are pivotally interconnected as braces between the base 14' of the turntable and the distal end of the parent section 20 of the boom. The extensible or telescoping sections 22 of the boom are complemental in cross section to the parent section and track within the parent section on rollers 24. All are extended and retracted by a dual cable and pulley drive system 26 which interconnects each of the telescoping sections with the spool or drum 28 of a power driven, cable-winding winch at the proximal end of the parent section 20. The drum is partitioned into three longitudinal segments 28'', 28', 28''', the endmost 28'' of which are helically grooved in opposite senses and have the two drive cables 30 and 32 of the system 26 interconnected therewith to be wound in and out of the grooving thereon. One 30 of the drive cables extends the full length of the boom to an attachment point 34 on the distal end 35 of telescopically innermost telescoping section 22'. The other drive cable 32 is sequentially wound, first, about an outboard pulley 36 on the distal end of the parent section, then about pairs of outboard pulleys 37 on the respective proximal and distal ends of the intermediate telescoping sections 22'', and then is attached to the proximal end of the innermost section 22', so that as the drum 28 is rotated in one direction, the system 26 operates to extend, first the telescopically outermost telescoping section, and then successively, each of the remaining telescoping sections until ultimately the boom is extended to its full length. Meanwhile, the first-mentioned cable 30 is paid off of the other end of the drum and is drawn out with the sections. Subsequently, when the direction of the drum is reversed, the cable 30 operates to collapse the sections one by one until they are substantially confined within the parent section 20. Compare the full line and broken line representations of the boom in FIG. 1.

The drum 28 also has a third cable 38 wound about the intermediate segment 28' thereof. This third cable 38 takes the form of a flexible electrical conduit carrying four electrical relay leads 40 and a power lead 41 therein. See FIG. 5. The relay leads 40 are operatively interconnected with the power from the source 43 in a control panel 42 on the distal end 35 of the boom, and for this purpose, the control panel is equipped with four switch control levers 44 which can be manually operated by a man standing in a bucket 46 on the end 35 of the boom. One lever and one lead 40' are interconnected with the turntable motor 48, and enable the operator to rotate the boom about the carriage from his position in the bucket. Another lever and lead 40'' are interconnected with the winch motor 50, and enable the operator to extend and retract the boom from his position in the bucket. Still another lever and lead 40''' are interconected with the hydraulic system for the cylinders 18, and enable the operator to raise and lower the boom in relation to the tractor. The fourth lever and lead 40'''' are interconnected with a free-spooling, power driven haul-in winch 52 on the rear end of the tractor, and enable the operator to actuate and deactuate the motor 54 of this winch for purposes of hauling in a turn of logs 56 to a position at the rear of the tractor, as shall be explained.

Figure 5:
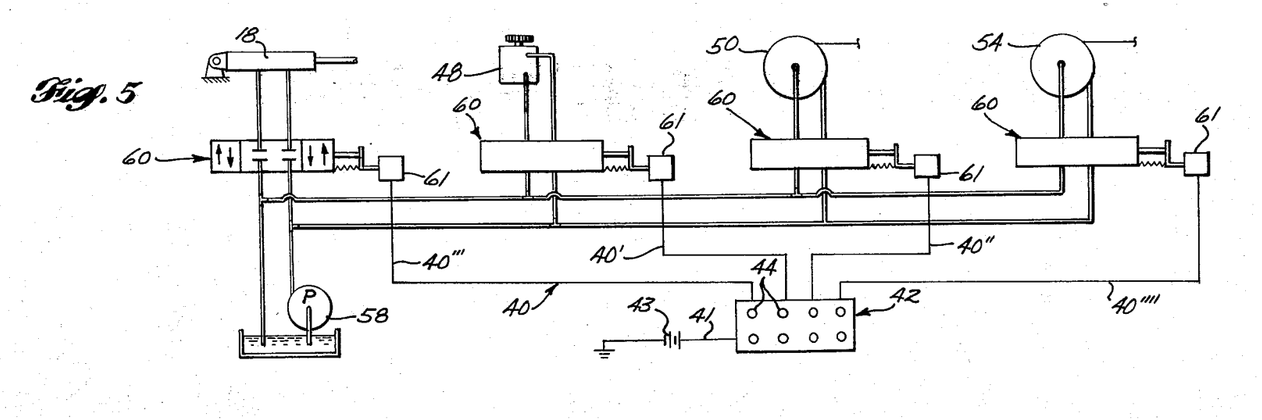
FIG. 5 is a schematic representation of the manually actuatable control system for the boom, and for the winch means for the haulback cable.
Figure 6:
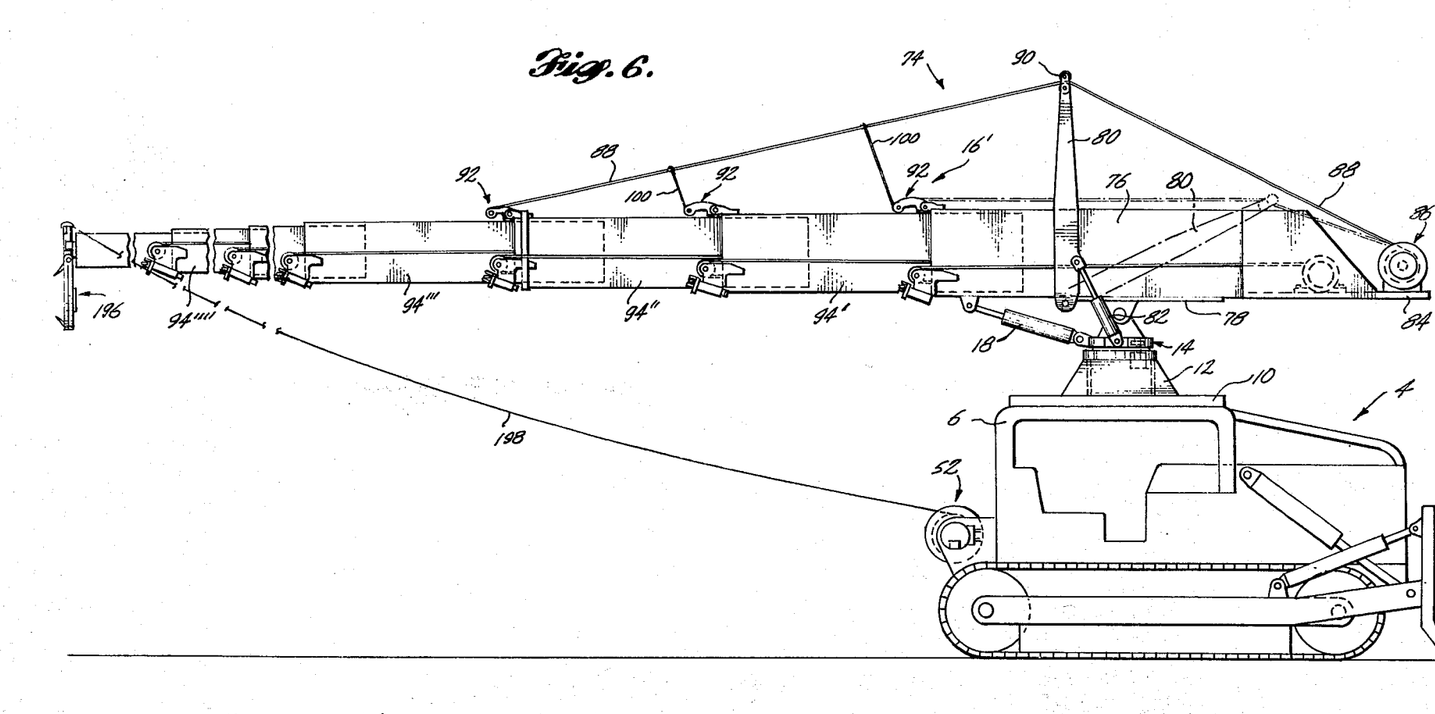
FIG. 6 is a side elevational view of another such skidder which is equipped with a collapsible truss, and with means on the boom for employing the boom in attaching the cable to the logs.

FIG. 5 also illustrates the other particulars of the control system for the respective motors 48, 50, 54 and the pump 58 of the cylinders 18. Each motor is hydraulically operated by the same pump 58, and the hydraulic system for each motor, and for the cylinders 18, is disposed on the carriage and includes a four-way solenoid operated valve 60, the solenoid 61 of which is interconnected with one of the respective leads 40 from the control panel 42 of the boom. Accordingly, the cylinders 18 and each motor 48, 50, 54 can be separately operated as is necessary in the haul-in operation to be explained.

The haul-in winch 52 is equipped with a conventional haulback cable 62 having a set of sliding bells 64 and choker lines 66 at the attachment end thereof. Also, the distal end 35 of the boom has a set of choker hooks 68 along the underside thereof, adjacent the bucket. In the first stage of the haul-in operation, the boom is retracted and the loop of the bell of each choker line is hung about one of the hooks. The operator then mounts the boom in the bucket and, using the lever controls 44, proceeds to extend and/or pivot and rotate the boom as is necessary to place the distal end of the same at the site of the logs. Then after dismounting, he removes the bells from the hooks and attaches each choker line to one or more logs. Finally, after remounting the boom in the bucket, he uses the lever control for the haul-in winch 52 to skid the logs into position at the rear of the tractor, and either sequentially or simultaneously uses the other controls 44 to retract the boom so that he can dismount at the tractor and disconnect the choker lines to resume the operation for another turn of logs.

Alternatively, the operator may remain in the bucket throughout the operation and a second man may walk over the ground to attach and detach the choker lines to the hooks and the logs as needed.

Sorting of the choker lines is always a problem in any haul-in operation. The illustrated embodiment provides for sorting them at the tractor, that is when the respective bells are hung about the hooks. Alternatively, the bells may be hung about a single hook at the distal end of the boom, and/or there may be means suspended from the distal end of the boom which can be clamped about the haulback cable, either as the sole means for attaching the cable, or at the same time as the cable and the bells are hung over the hook. Other means may also be employed for detachedly connecting the haulback cable to the distal end of the boom for the first stage of the operation.

Where the choker lines are sorted at the tractor, as in the illustrated embodiment, preferably there is a bypass control 70 on the haul-in winch with which to operate the winch from a standing position on the ground for purposes of tightening up the haulback cable when the choker lines are sorted.

Also, a full set of bypass control 72 may be provided at the driver's seat with which to extend, retract, pivot, and rotate the boom from a sitting position in the seat.

In an alternative mode of operation, the boom may be operated from the driver's seat for purposes of extending the same with the haulback cable attached thereto, and then the operator may dismount and walk to the distal end of the boom where, after detaching the haulback cable, he employs the control panel 42 to operate the haul-in winch 52, and if desired, to retract the boom as well in a separate operation. In such a case, the bucket is optional inasmuch as the operator may operate the control panel from a standing position on the ground. The pivotal feature of the boom is particularly useful in this mode.

In FIGS. 6-10, the skidder is equipped with an extensible and retractable truss 74 to support the cantilevered portion of the boom 16' at an intermediate point thereon. The parent section 76 of the boom has a reinforced saddle 78, and an inverted, U-shaped yoke-like spar or mast 80 is pivotally secured to the saddle so as to straddle the section in the region of the turntable 14. The mast is braced by a pair of hydraulic cylinders 82 on the turntable, and the cylinders are also used to swing the mast up and down between an extended position in which the mast is vertically upright, and a retracted position in which the mast is obliquely inclined to and snugged down against the top of the parent section in the direction of the proximal end thereof. Compare the full-line and dotted-line conditions of the mast in FIG. 6. Also note that the proximal end of the section is feathered down to an open bench 84, and that a torsion-loaded drum 86 is mounted on the bench to serve as a self-winding reel and tensioning device for a flexible pendant 88 which is extended forwardly and upwardly from the drum through a fairleader 90 at the top of the mast, and thence onward to the forwardmost of a series of dogs 92 which are pivotally mounted on each of the parent section 76 and the two telescopically outermost telescoping sections 94' and 94''. The dogs are trunnioned in yoke-like brackets 96, and the brackets are cantilevered forwardly from the tops of the respective sections 76, 94' and 94'' at the distal ends thereof, and adapted to position the heels 98 of the dogs over each of the adjacent outermost sections 94', 94'', and 94'''. The heels are arcuate in configuration and normally slidably engage with the upper faces of the latter sections. However, when the truss is erected over the boom, the dogs are subjected to clockwise pivotal motion and the tips of the heels are depressed or "thumbed" into the surface of the respective sections to lock them against relative movement. In the case of the forwardmost dog, the pivotal motion is generated by the pendant. In the case of the other dogs, the motion is generated by a series of flexible tie-lines 100 which extend between the pendant and a series of smaller-scale, torsion-loaded, self-winding reels 102 which are mounted on the toe ends of the dogs. In both cases, moreover, the motion is limited by shoulders 104 which are raised on the brackets to act as stops for the dogs. Preferably, a screw 106 is interposed between the shoulders and opposing shoulders 108 on the dogs, to allow for fine adjustment in the extent of their motion.

As in the embodiment of FIGS. 1-5, the boom 16' is equipped with a dual cable and pulley drive system 26', but in the present instance, the operation of extending the boom is interrupted after the sections 94', 94'', and 94''' have been extended, in order to enable the truss 74 to be erected before the remaining sections 94'''', etc., are extended. In this way, the sections 94', 94'' and 94''' can be integrated into a rigid assembly before the remaining sections are extended from the outermost point thereof, that is, from the distal end of the section 94'''. This in turn minimizes the "droop" which might otherwise occur in the cantilevered portion of the boom when it is fully extended.

Figure 8:
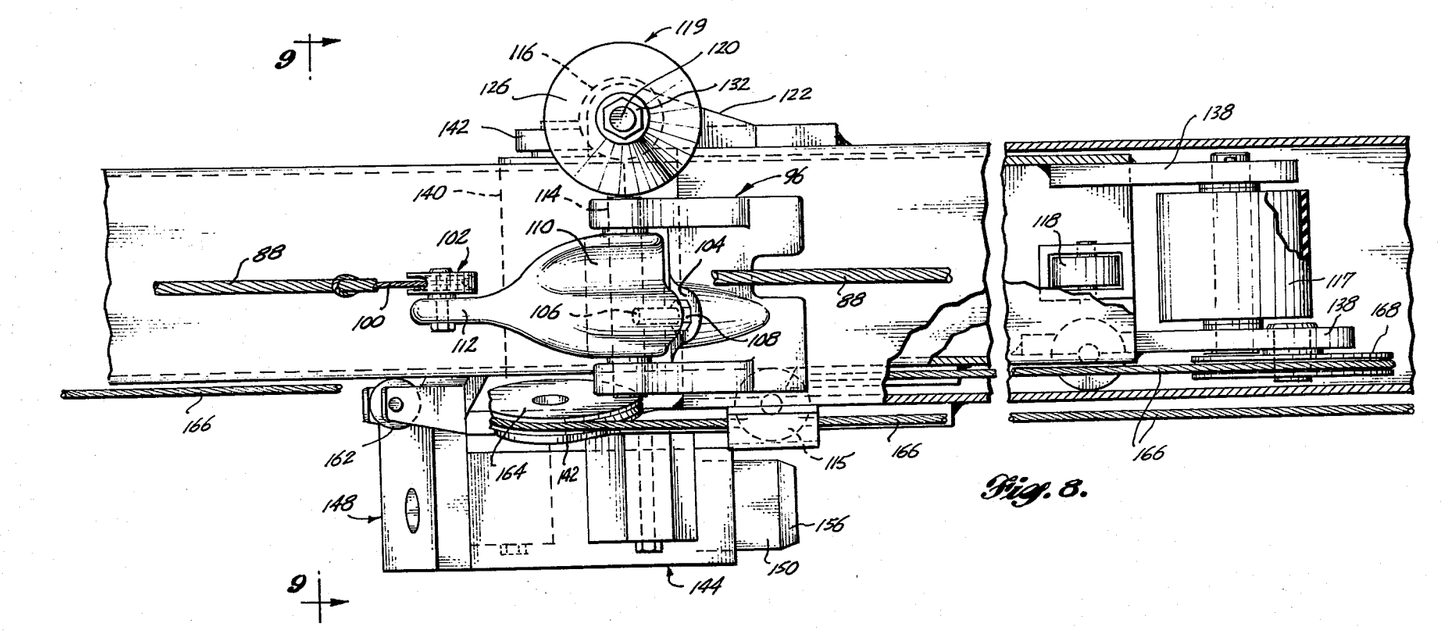
FIG. 8 is a part cross-sectional, part plan view of the boom.
Figures 9, 10:
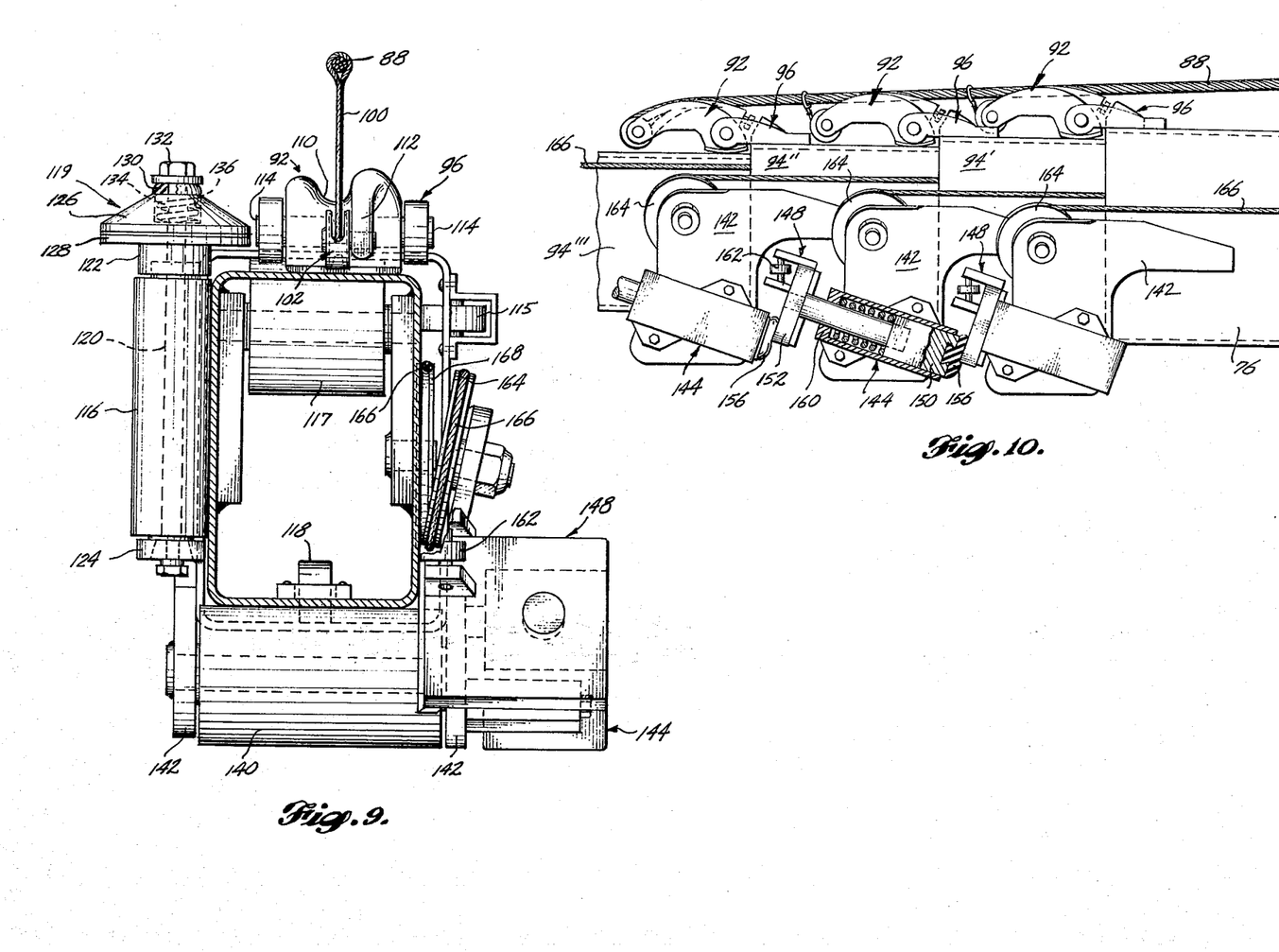
FIG. 9 is a cross-sectional view of the boom along the line 9—9 of FIG. 8.
FIG. 10 is an enlarged part side elevational view of the boom in the retracted condition thereof.
Figure 11:
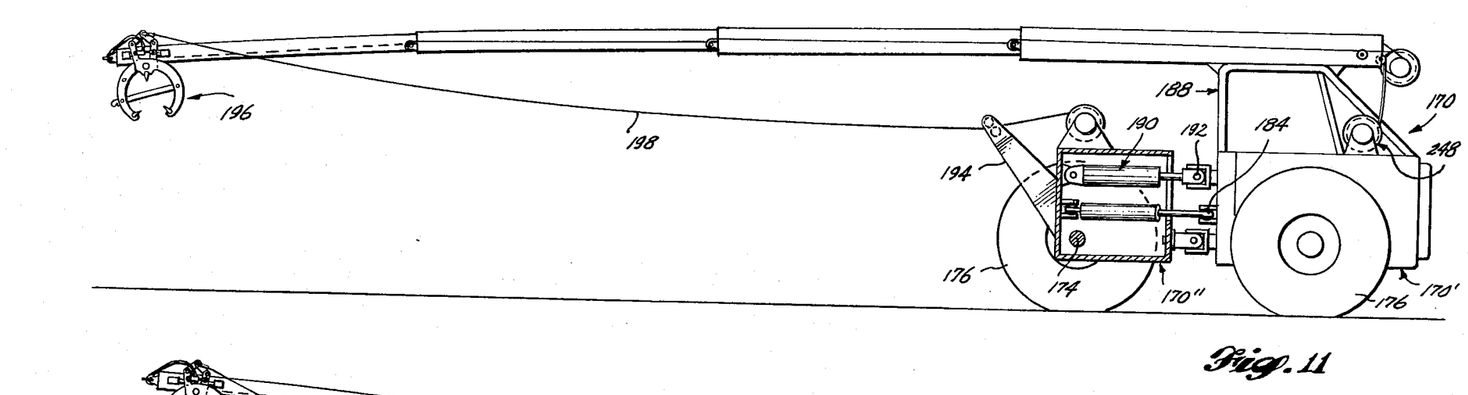
FIG. 11 is a side elevational view of a wheeled-tractor-type skidder, the carriage of which is in two relatively articulated parts, and the boom of which is equipped with a somewhat modified cable attaching means thereon.

When the boom is retracted, the process is reversed, in that the sections 94'''', etc. are retracted into the rigidified assembly comprising sections 94', 94'' and 94''', and then the latter sections are retracted into the parent section 76 after the truss has been collapsed. In the collapsed condition of the truss, the pendant 88 is received in a series of longitudinally aligned swales 110 which are formed in the bodies of the dogs 92. As seen in FIGS. 8 and 9, the arms 112 of the dogs are off center in relation to the trunnions 114 for the same, and the reels 102 are mounted on the more widely spaced sides of the arms, and in alignment with the swales, so that when the truss is collapsed, the pendant can drop into the swales and remain under tension lengthwise of the boom, without interference from the arms.

As in the embodiment of FIGS. 1-5, the telescoping sections 94', etc., of the boom 16' in FIGS. 6-10 also track within one another, and within the parent section, on rollers 115, 116, 117 and 118 at the sides, tops, and bottoms of the sections. However, the rollers 116 on one side of the boom are elongated, and are equipped with frictional drags 119 to exert a drag in turn on the motion of the sections as they track in relation to one another. As seen in FIG. 9, each roller 116 is affixed to an elongated bolt 120, and the bolt in turn is journaled in a pair of brackets 122 and 124 which are forwardly cantilevered from the distal end of the larger of each pair of adjacent sections. The lower end of the bolt is taper bearinged in the lower bracket 124, whereas the upper end has a conical disc 126 engaged thereon which interfaces with a flanged disc 128 on the upper bracket 122. An elastomeric washer 130 is engaged between the conical disc and the head 132 of the bolt, and a small coiled spring 134 is caged about the bolt in a recess 136 in the disc. Thus, on tightening or shortening the length of the bolt, the increased compression of the spring operates to increase the frictional engagement between the discs 126 and 128, and this in turn diminishes the free-wheeling action of the roller 116 in the brackets.

Figure 7:
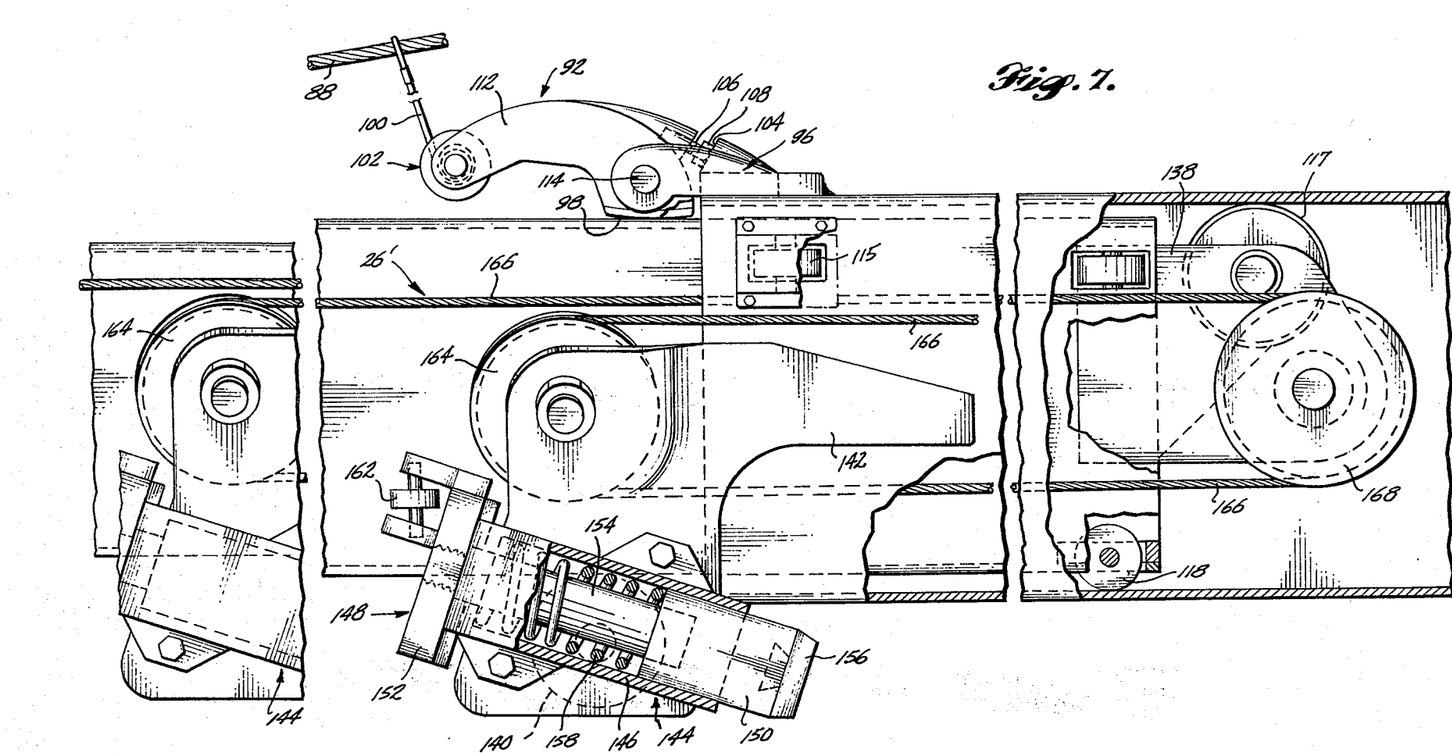
FIG. 7 is a part cross-sectional, part side elevational view of the boom on the latter skidder.

As indicated, the sections also track within one another on sets of horizontal rollers 117 and 118. Referring to FIGS. 7, 8 and 9, it will be seen that the smaller section in each pair of sections has a pair of brackets 138 cantilevered rearwardly from the proximal end thereof, and the ends of the brackets carry a heavy duty roller 117 thereon which is sized to rotatably engage with the inside of the larger section at the top thereof. The roller 117 is accompanied by a smaller roller 118 which is mounted in the bottom of the smaller section to assure that the sections telescope with one another.

Additional support is provided by other rollers 140 which are supported outboard from the distal ends of the larger sections and saddled below the smaller sections of the pairs. The larger sections have pairs of dog-leg-shaped brackets 142 thereon which are cantilevered forwardly from the distal ends thereof so as to depend slightly below the adjacent smaller sections. The rollers 140 are journaled in the depending portions of these brackets and are rotatably engaged with the smaller sections to support the proximal ends of the same.

The brackets 142 on one side of the boom are also equipped with mutually interacting bumper and shock absorber units 144. Each unit comprises a tubular housing 146 which is closed at the distal end thereof and bolted to the bracket 142 at an incline to the longitudinal axis of the boom. In addition, with the exception of the rearmost unit, each unit comprises a plunger 148 which is slidably engaged in the closed end of the housing and characterized with an interior butt portion 150 and an exterior head portion 152, which are interconnected by a cylindrical neck portion 154. The butt portion is slidably engaged in the orthogonal bore of the housing, and has an elastomeric tip 156 affixed to the proximal end thereof. The neck portion has a coiled spring 158 thereabout which is caged between the butt portion of the plunger and the closed end 160 of the housing. The head portion is sufficiently enlarged to be abutted by the tip of the next preceding unit when the sections 94', etc. are retracted into the condition of FIG. 10. Thus, the spring 158 in each unit acts as a shock absorber for the respective unit, as well as for the other units outboard therefrom, so that the momentum of the telescoping sections is absorbed over a progressively larger number of springs as the boom is retracted.

The head portions 152 of the units also have small rollers 162 mounted outboard thereof, to stabilize the plungers with respect to the boom. Moreover, the upper corners of the brackets are outwardly swaged to accommodate canted pulleys 164 thereon, and as seen in FIG. 9, the pulleys pass the roved drive cable 166 of the drive system 26' in and out of the respective sections to inboard pulleys 168 on the brackets 138 of the smaller sections.

Referring now to the embodiment illustrated in FIGS. 11–14, it will be seen that the skidder has a two-part carriage 170 with an articulated draft connection 172 therebetween. Each part of section 170' or 170" of the carriage has a cross axle 174 and a pair of balloon-tired wheels 176 mounted thereon. The front section 170' is also equipped with an engine 178 for driving the skidder. The draft connection 172 includes a universal joint 180 to enable the sections to be jackknifed out of alignment as in FIG. 14 for purposes of steering the skidder, and also to enable the sections to undergo relative rotation for purposes of aiding in the overland travel of the skidder. The skidder is steered through the medium of a pair of double-acting hydraulic (or pneumatic) cylinders 182 which are pivotally interconnected between the back portions of the frames of the sections. Moreover, the connections between the cylinders and the frames take the form of a ball-swiveled pin connections 184 so that the cylinders can undergo relative rotation with respect to the sections 170' and 170" and vice versa.

Figure 1:
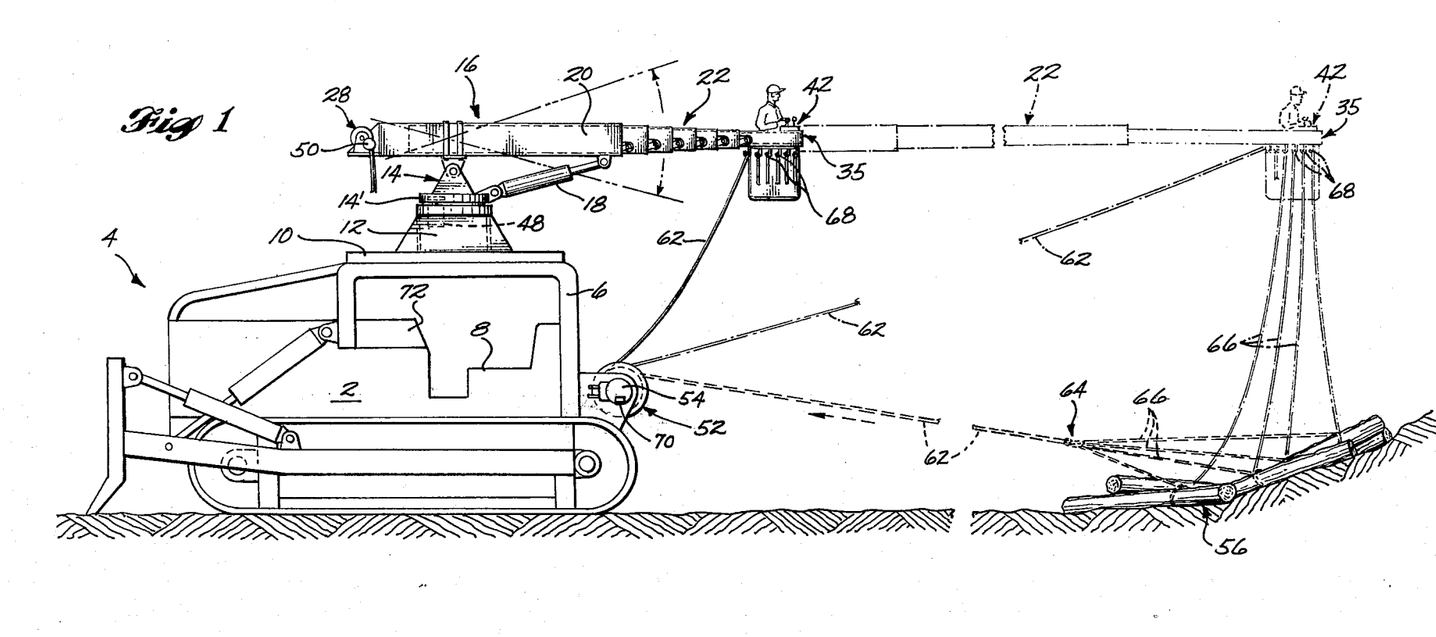
FIG. 1 is a side elevational view of a crawler-tractor-type skidder employing certain aspects of the invention.
Figure 2:
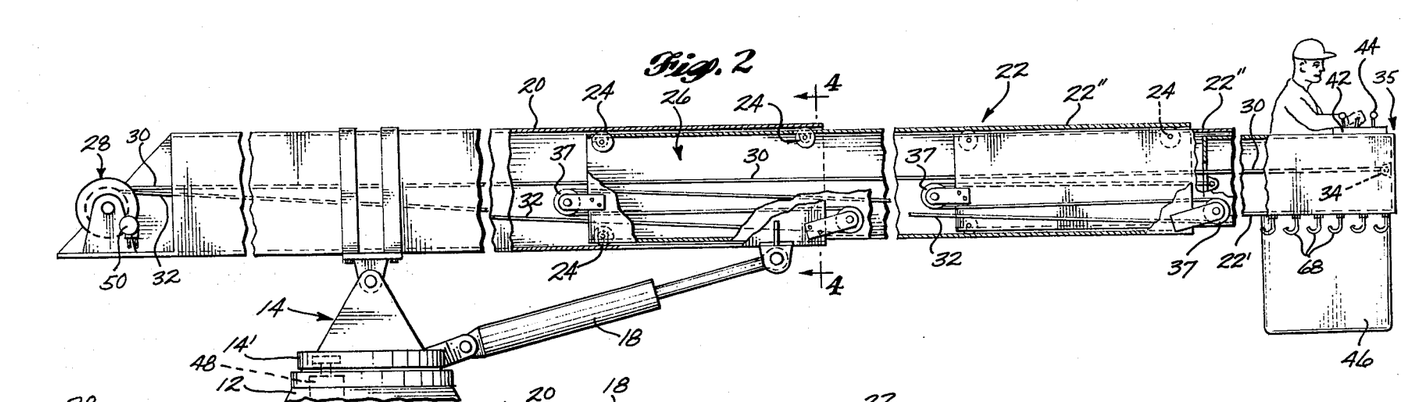
FIG. 2 is a part side elevational view of the boom on the skidder.
Figures 3, 4:
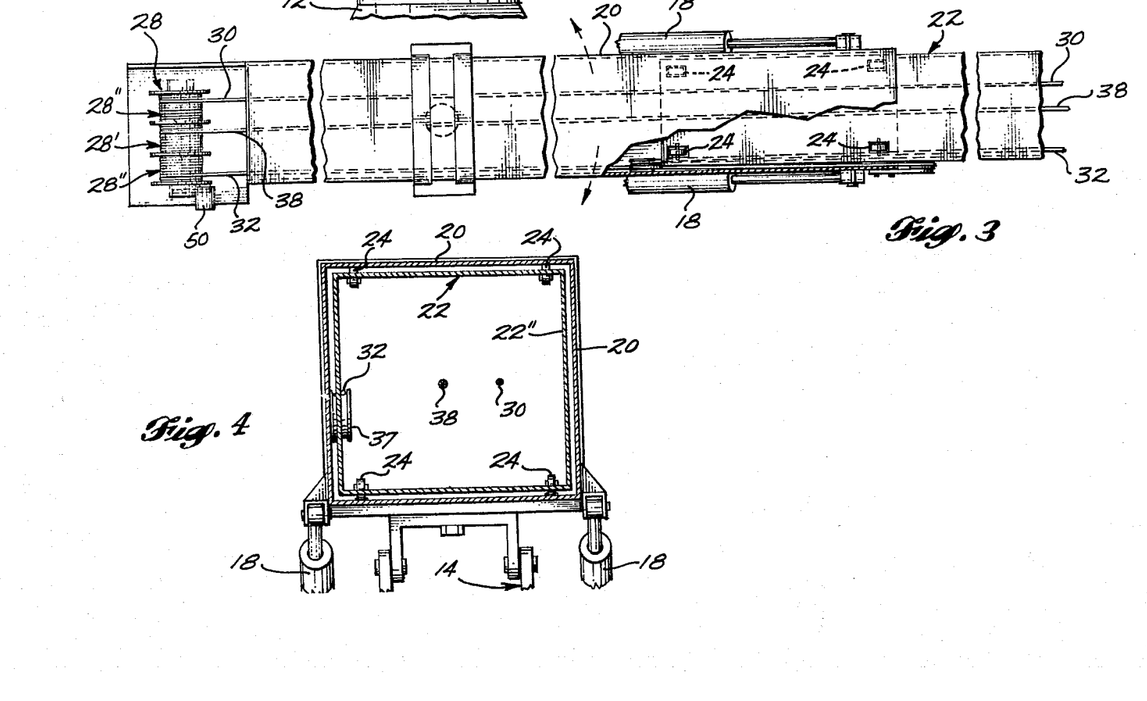
FIG. 3 is a part plan view of the boom.
FIG. 4 is a cross-sectional view of the boom along the line 4—4 of FIG. 2.
Figures 12, 21:
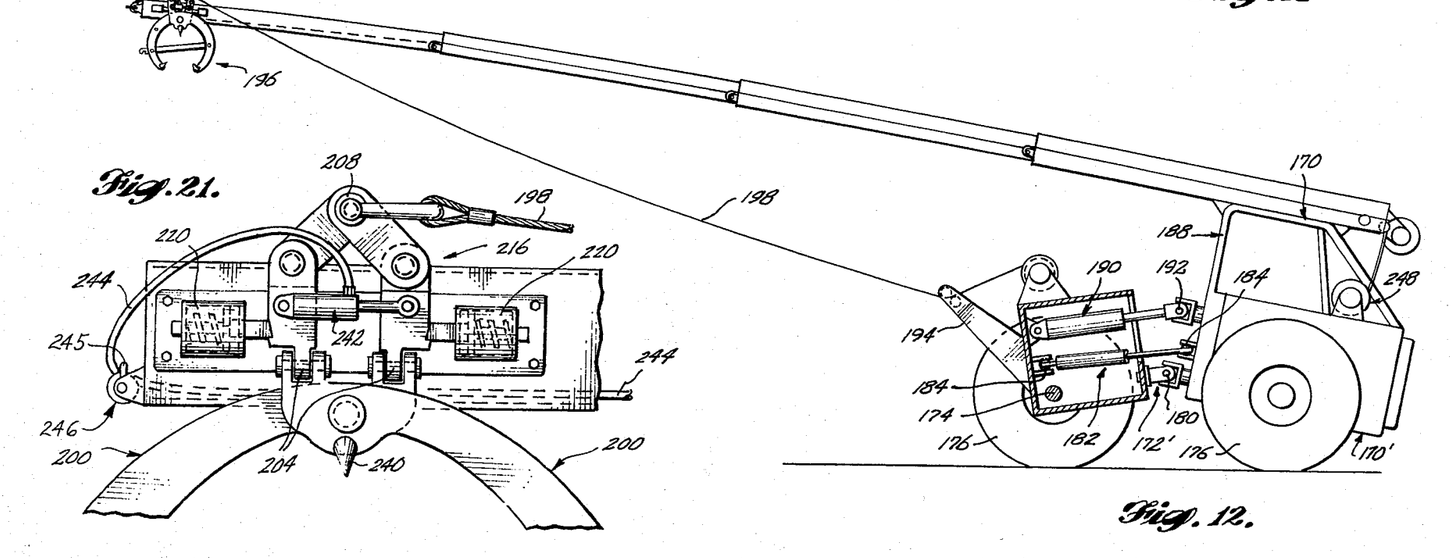
FIG. 12 is another side elevational view of the skidder in FIG. 11 showing the mode of raising and lowering the boom.
FIG. 21 is a part side elevational view of the distal end of the boom in FIGS. 11 and 12 showing the cable attachment means thereon.
Figure 13:
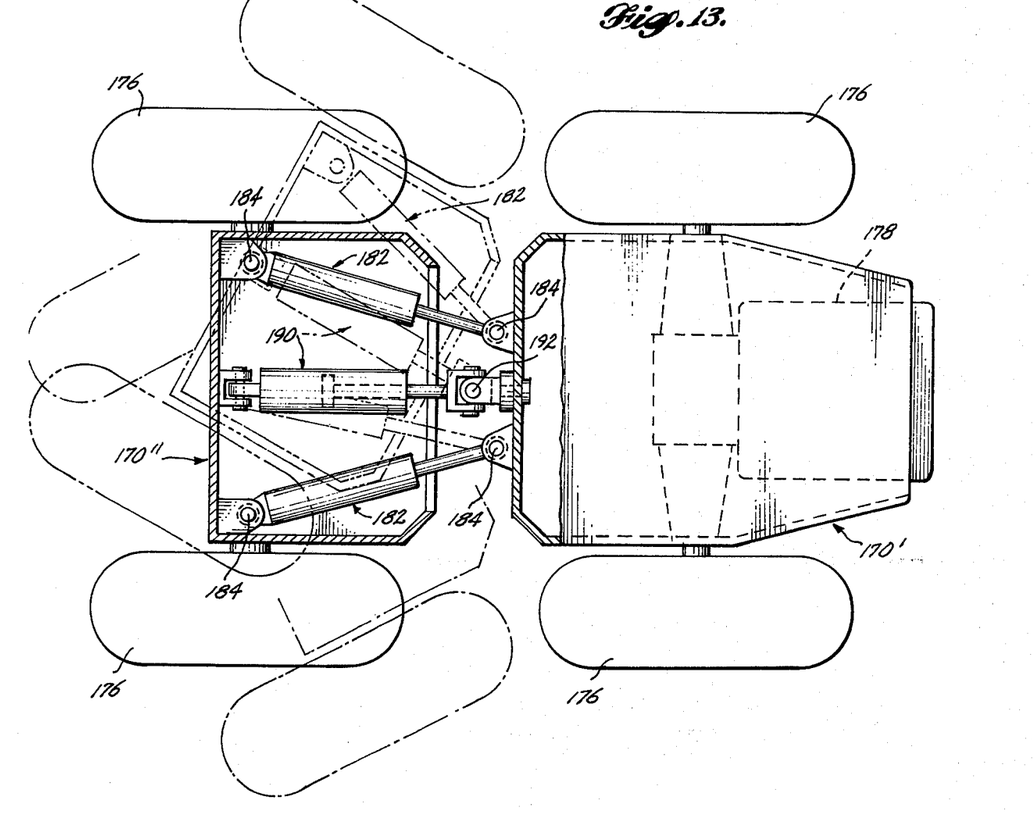
FIG. 13 is a part cross-sectional plan view of the carriage showing another aspect of this mode in schematic form.
Figure 14:
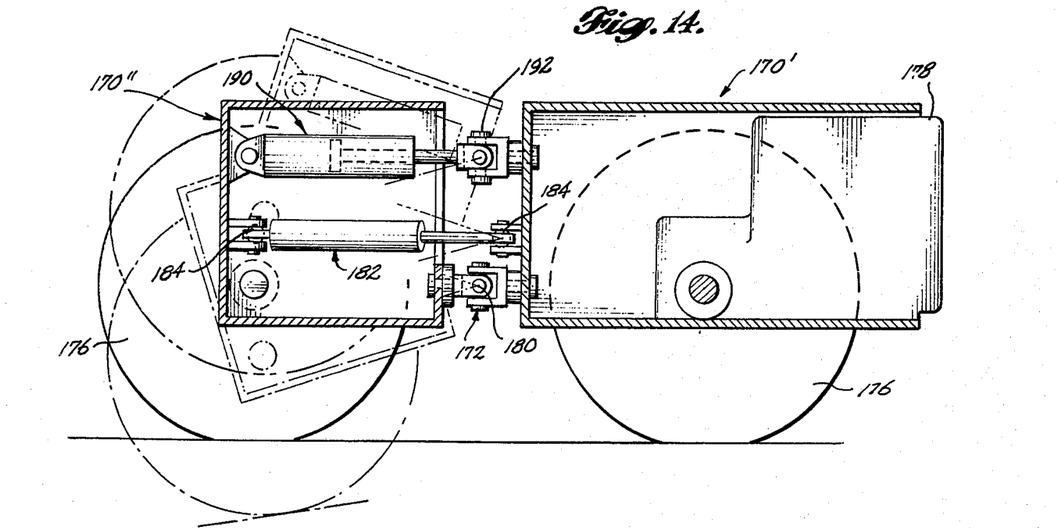
FIG. 14 is a part cross-sectional side elevational view of the carriage which also shows the mode in schematic form.
Figure 15:
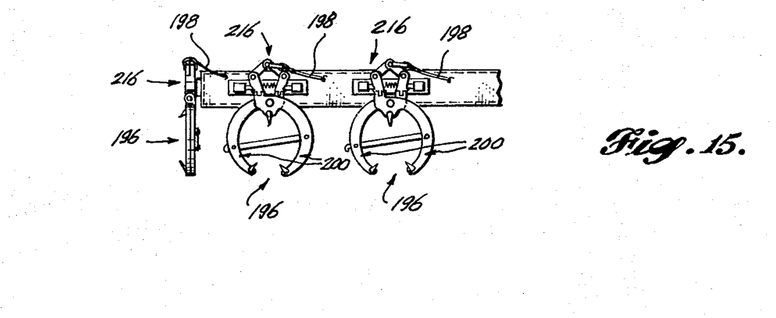
FIG. 15 is a part side elevational view of the distal end of the boom on the last-mentioned skidder in somewhat modified form.

The boom 186 is rigidly affixed to the cab 188 of the skidder on the front section 170', and in order to raise and lower the distal end of the boom in the manner of FIG. 12, the sections are also interconnected by a third double-acting hydraulic (or pneumatic) cylinder 190 which is pivotally interconnected between the midpoints of the back portions of the frames of the sections, and sufficiently elevated above the draft connection 172 to generate opposing moments in the sections about the axles 174 and thereby raise or lower the joint 180 of the draft connection, when the cylinder 190 is extended or retracted from the condition of FIG. 4. Moreover, the cylinder 190 is clevised to the front section 170' through a universal joint 192 that enables the sections to undergo all modes of relative displacement during steering, tilting and overland travel of the vehicle. Ordinarily, the vehicle is also jackknifed when the boom it tilted downwardly, in order to clear the boom to one side of the arch 194 of the back section 170".

In FIGS. 6–21, each skidder is also equipped with one or more grapples 196 which are releasably engaged on the distal end portion of the boom. The grapples are transported to the site of the logs at the attachment end of more or more haulback cables 198, and are responsive to lowering and raising of the boom to alternately engage one or more of the logs, and then disengage from the boom, so that the cables can be used to haul in the logs to the carriage. The grapples 196 may be releasably engaged on the tip of the boom, as in FIG. 6; and/or on the sides of the boom, as in FIGS. 11–21. In either event, each grapple comprises a pair of barb-ended, crescent shaped tongs 200 which have notched bell crank levers 202 on the pivotally interconnected ends 203 thereof. The arms of the levers are coaxially hinged to the bight of the tongs at 204, so that they are rotatable into and out of the plane of the tongs. The relatively free ends of the levers are pivotally interconnected with one another by a pair of relatively articulated links 206, the pivotal connection 208 between which is clevised in turn to a haulback cable 198. The levers also have a coiled spring 210 caged therebetween, which is recessed into the opposing faces of the levers to bias them in the direction of opening the tongs at the barbed ends 212 thereof. In use, however, the levers are engaged on the boom under an opposing bias, and a notched trigger bar 214 is needed between the tongs to maintain a sizable gap between the ends 212 thereof, as shall be explained.

Referring in particular to FIGS. 15–21, it will be seen that the distal end of the boom is equipped with one or more sets of yieldable pincers 216 within which the levers 202 of the grapples are engaged against the bias of the springs 210 therebetween. Each set of pincers comprises a pair of mutually opposing latching dogs 218 which are slidably engaged in a corresponding pair of housings 220 that are laterally outstanding on the sides or tip of the boom. The housings have springs 222 caged therein about the dogs, and the dogs are flanged so as to be loaded in the direction of one another by the springs 222. In addition, the ends 224 of the dogs are mitered to engage in the notches 226 in the side walls 228 of the levers, and the notches and walls are adapted in turn so that an upward force on the grapple will not disengage it from the pincers, yet a downward force will have the effect of doing so. Note that under the bias of the spring 210, the levers assume a V-shaped condition in the pincers, but that when desired, they can be disengaged from the pincers by causing the dogs to slide relatively up the length of the walls 228 against the bias of the spring 210.

Figures 18, 19:
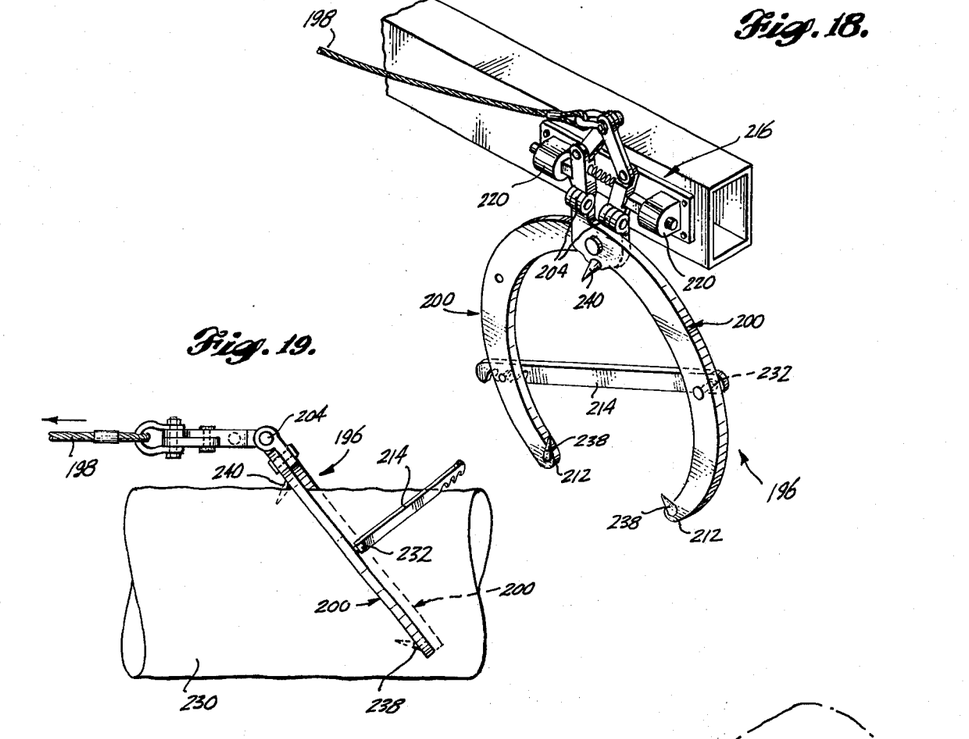
FIG. 18 is a part perspective view of the end of the boom with a single cable attachment means thereon.
FIG. 19 is a side elevational representation of the attachment means after it has been attached to a log and detached from the boom.
Figure 20:
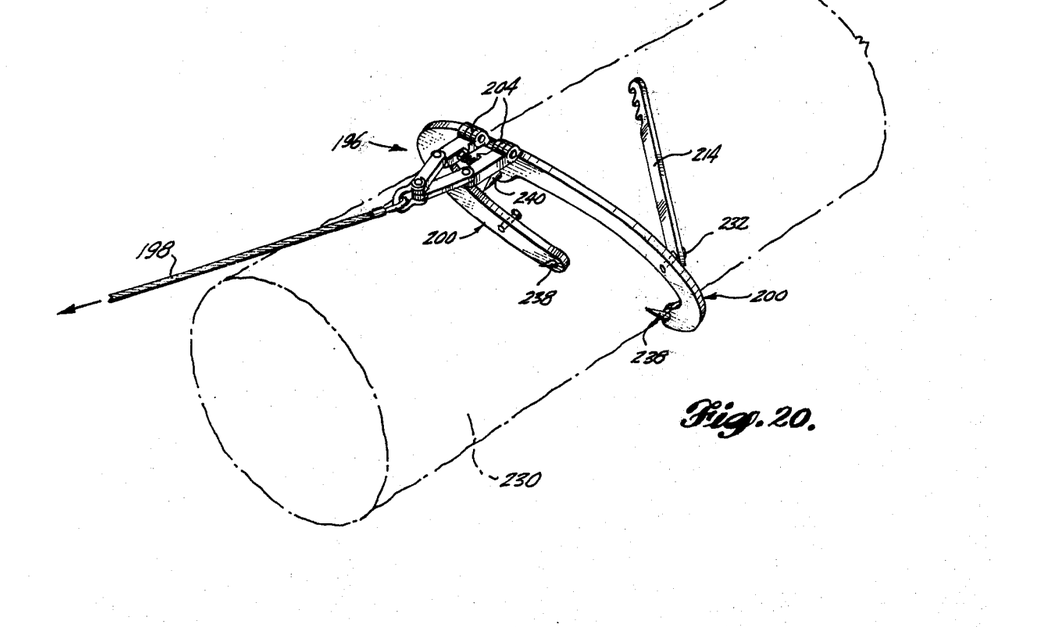
FIG. 20 is an isometric representation of the attachment means in this condition.

As seen in FIGS. 18–20, the downward force with which to so disengage the levers, is provided by the log 230 itself, after the trigger bar 214 has been tripped by the log to cause the grapple to engage the log. One end of the bar is interconnected with the right-hand tong in FIG. 18 by a ball and socket joint 232, whereas the other end of the bar has a series of notches 234 therein, one of which is releasably engaged with a flanged, laterally outstanding pin 236 on the other tong, to maintain the tongs in open condition against the bias of the dogs. Furthermore, the notch is disposed so that the bar is engaged over the top of the pin and can be released from the pin by a displacing force acting in the direction of the pincers. Initially, the tongs are closed by hand to the point where the bar 214 can be engaged with the pin at the appropriate notch, and then the tongs are raised to the side or tip of the boom and the levers are pressed against the dogs until the dogs yield sufficiently to enable the levers to snap into engagement between them. Then the boom is extended or shifted to the site of the log, and the end of the boom is lowered over the log to the extent that the barbed ends of the tongs straddle the log and the log displaces the trigger bar from the pin. This in turn places the tongs under the bias of the springs of the dogs, and the springs close the tongs sufficiently to dig the inwardly inclined barbs 238 on the ends thereof into the side of the log. Thereafter, the end of the boom is raised sufficiently to enable the weight of the log to disengage the grapple from the pincers and thus from the boom itself. This in turn leaves the grapple free to be hauled in, and when the haulin winch is operated, the grapple bends about the hinges 204 in the manner of FIGS. 19 and 20, and a third barb 240 on the top thereof, also digs into the log to aid in gripping it. Note also that all three barbs 238 and 240 are relatively outwardly inclined from the same face of the grapple, to lend themselves to this final condition of the grapple in the skidding operation. Similarly, the joint 232 between the trigger bar and the tongs, enables the bar to swing aside in the manner of FIGS. 19 and 20.

Where a plurality of grapples are employed, each is equipped with a separate haulback cable and the haul-in winches is multisectioned, or a plurality of coaxial haul-in winches are employed to haul in the cables individually or conjointly with one another.

The embodiment of FIGS. 15–20 is employed to haul in a single log, whereafter the boom is retracted, the grapple is retriggered and returned to the boom, and then the boom is reextended to the site of a second log. However, the embodiment of FIG. 21 has no trigger bar and is adapted so that it is possible to collect a plurality of logs at the carriage while the boom is left in the extended condition and if necessary swung about from the site of one log to another. This follows from the fact that in the embodiment of FIG. 21, a hydraulic (or pneumatic) cylinder 242 is substituted for the spring 210, and the cylinder is pivotally interconnected with the levers 202 in the crotch therebetween, so that it can be employed to open the tongs after a log has been grappled and hauled in to the carriage. The hydraulic conduit 244 for the hoses of the cylinder is threaded through the guide 245 of a sheave 246 at the distal end of the boom, and then through the length of the boom to a free-spooling friction driven winch 248 of known construction. The conduit 244 is also adapted to serve as a haulback cable in that after a log has been released at the carriage, the winch 248 can be employed to draw the grapple back to the distal end of the boom, while simultaneously paying out the cable 198, and then to lift the grapple off of the ground at the end of the boom, so that the boom can be used to position the grapple over a second log for a repeated operation in which the cable 198 is used to haul in the second log. The adjustable wind-up shoes of the winch 248 are set to release the conduit at a predetermined tension, such as at 75 psi. In this way the movement of the boom cannot risk damage to the boom or the conduit, as for example where the grapple snags on something during the act of swinging the boom from one side to the other.

The pump (not shown) for the cylinder 242 may be located on the carriage and interconnected with the cylinder by hydraulic hoses in conduit 244, as in FIG. 21; or the pump may be located on the grapple and electrically controlled by means including an actuator (not shown) which is located on the carriage and interconnected with the pump by an electrical lead passing through the boom and about the sheave 246 in the manner of the conduit 244.

Figure 16:
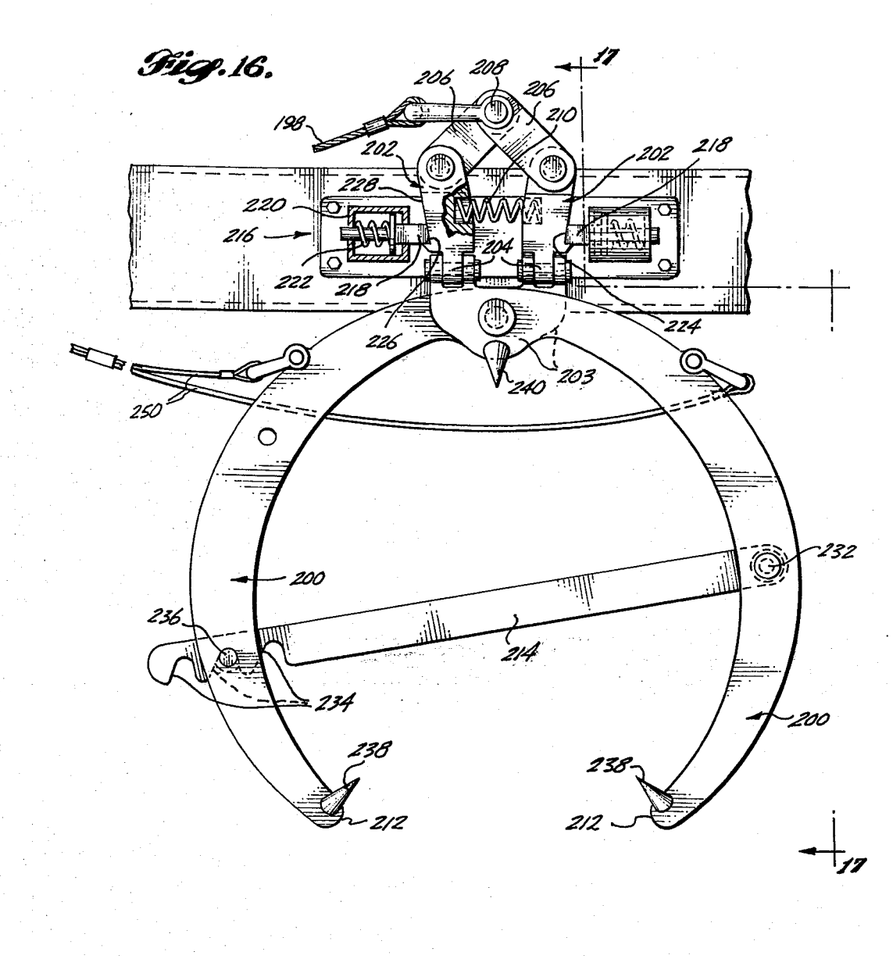
FIG. 16 is an enlarged part side elevational view of a cable attachment means on the end of the boom.
Figure 17:
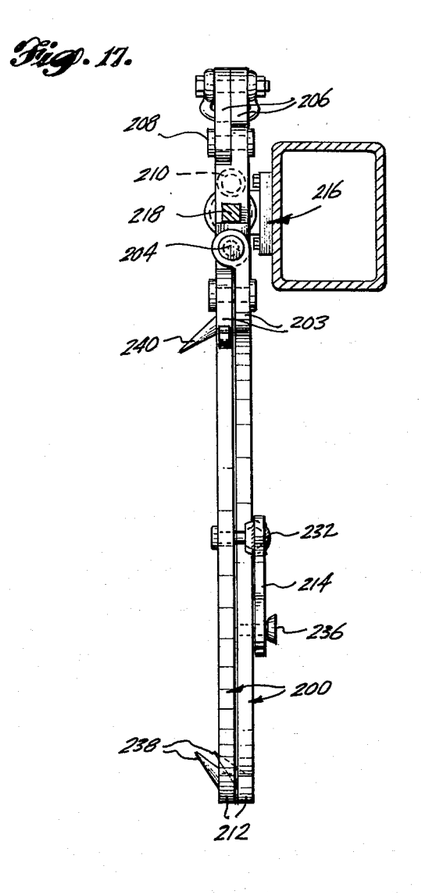
FIG. 17 is a cross-sectional view of the boom showing the cable attachment means in side elevational representation.

Alternatively, a second haul-in cable, with a Y-150 on its end, can be passed through the length of the boom, passed through the guide of the sheave 246, and attached to the tongs as in FIG. 16, to be used to open the tongs in lieu of the conduit 244.

Preferably, each boom is constructed of a lightweight metal material such as aluminum, and collapses to a condition in which the tractor can be driven up and down steep slopes and over piles of debris without any tendency to tip due to the outboard weight of the boom. In my presently constructed embodiment, the boom weighs approximately 400 lbs.

What is claimed is:

1. In a mobile log skidder, a carriage having an extensible and retractable multi-sectioned boom mounted thereon, free spooling cable winding winch means on the carriage having a haulback cable wound thereon independently of the boom, means connecting the haulback cable to an extensible section of the boom for payout of the cable with the section on extension of the boom, means in the connection between the cable and the section whereby an operator can detach the cable from the boom at the site of a log for haul in of the cable by the winch means independently of the boom, means for lowering and raising the extensible section of the boom in relation to the ground, and means on the attachment end of the cable for engaging a long, said log engaging means being releasably engaged on the extensible section of the boom and responsive to lowering and raising of the section to alternately engage a log and disengage from the boom, respectively.

2. The mobile log skidder according to claim 1 wherein the log engaging means define a pair of jaws having an open-mouthed recess therebetween, and shiftable control means thereon which are operable to open and close the mouth of the recess.

3. The mobile log skidder according to claim 2 wherein the log engaging means also include means which are operative to bias the control means in the direction of opening the mouth of the recess, and means which are operatively interconnected with the haulback cable whereby tensioning the cable causes the control means to close the mouth of the recess; and wherein the boom has a pair of yieldably biased pincers on the extensible section thereof, and the log engaging means are releasably engaged in the pincers so that the bias of the pincers operates counterdirectionally to the bias on the control means and tends to close the mouth of the recess, there being a log engaging trigger on the jaws which is operative to open the mouth of the recess against the bias of the pincers, but which is displaceable in relation to the jaws by a log disposed in the mouth of the recess, so that the mouth is closed by the bias of the pincers and the log is engaged by the log engaging means to the extent that the weight of the log can be used to disengage the log engaging means from the boom when the extensible section of the boom is raised in relation to the ground.

4. The mobile log skidder according to claim 3 wherein the jaws are defined by a pair of relatively pivotally interconnected tongs which have bell-crank-like control levers on the pivotally interconnected ends thereof, the relatively free ends of which levers are pivotally interconnected with the attachment end of the haulback cable.

5. The mobile log skidder according to claim 4 wherein the levers are coaxially hinged to the pivotally interconnected ends of the tongs, so as to be rotatable into and out of the plane of the tongs.

6. The mobile log skidder according to claim 4 wherein the biasing means take the form of a mechanical servo mechanism which is pivotally interconnected between the levers in the crotch thereof, to bias the levers in the direction of opening the mouth of the tongs.

7. The mobile log skidder according to claim 6 wherein a second haulback cable is Y-connected with the tongs to open the mouth thereof.

8. The mobile log skidder according to claim 4 wherein the biasing means take the form of a hydraulically or pneumatically operated servo mechanism which is pivotally interconnected between the levers in the crotch thereof, to bias the levers selectively in the directions of opening and closing the mouth of the tongs.

9. The mobile log skidder according to claim 3 wherein the pincers take the form of a pair of spring-loaded dogs which are mutually opposed to one another on a side or tip of the boom to receive the log engaging means therebetween.

10. The mobile log skidder according to claim 3 wherein the trigger takes the form of a bar, one end of which is pivotally interconnected with one of the tongs by a universal joint, and the other end of which is releasably engageable with the other tong in such a way that the bar is disengageable from the other tong by a log interposed in the recess adjacent the mouth thereof.

11. In a mobile log skidder, a carriage, an elongated boom which is supported in a generally horizontal disposition on the carriage at a point operatively adjacent the proximal end of the boom, means for lowering and raising the distal end of the boom in relation to the ground, cable-winding winch means on the carriage having a haulback cable wound thereon, and a log engaging grapple which is releasably engaged on the distal end portion of the boom and attached to the attachment end of the haulback cable, and responsive to lowering and raising of the distal end of the boom to alternately engage a log and disengage from the boom, respectively, for haul in of the log by the winch means independently of the boom.

12. The mobile log skidder according to claim 11 wherein the grapple defines a pair of jaws having an open-mouthed recess therebetween, and relatively shiftable control means thereon which are operable to open and close the mouth of the recess.

13. The mobile log skidder according to claim 12 wherein the grapple includes means which are operative to bias the control means in the direction of opening the mouth of the recess, and means which are operatively interconnected with the haulback cable whereby tensioning the cable causes the control means to close the mouth of the recess.

14. The mobile log skidder according to claim 13 wherein the boom has a pair of yieldably biased pincers on the distal end portion thereof, and the grapple is releasably engaged in the pincers so that the bias of the pincers operates counterdirectionally to the bias on the control means and tends to close the mouth of the recess, there being a log engaging trigger on the jaws which is operative to open the mouth of the recess against the bias of the pincers, but which is displaceable in relation to the jaws by a log disposed in the mouth of the recess, so that the mouth is closed by the bias of the pincers and the log is engaged by the grapple to the extent that the weight of the log can be used to disengage the grapple from the boom when the distal end of the boom is raised in relation to the ground.

15. The mobile log skidder according to claim 14 wherein the jaws are defined by a pair of relatively pivotally interconnected tongs which have bell-crank-like control levers on the pivotally interconnected ends thereof, the relatively free ends of which levers are pivotally interconnected with the attachment end of the haulback cable.

16. The mobile log skidder according to claim 15 wherein the levers are coaxially hinged to the pivotally interconnected ends of the tongs, so as to be rotatable into and out of the plane of the tongs.

17. The mobile log skidder according to claim 15 wherein the biasing means take the form of a mechanical servo mechanism which is pivotally interconnected between the levers in the crotch thereof, to bias the levers in the direction of opening the mouth of the tongs.

18. The mobile log skidder according to claim 17 wherein a second haulback cable is Y-connected with the tongs to open the mouth thereof.

19. The mobile log skidder according to claim 15 wherein the biasing means take the form of a hydraulically or pneumatically operated servo mechanism which is pivotally interconnected between the levers in the crotch thereof, to bias the levers selectively in the directions of opening and closing the mouth of the tongs.

20. The mobile log skidder according to claim 15 wherein the pincers take the form of a pair of spring-loaded dogs which are mutually opposed to one another on a side or tip of the boom to receive the log engaging means therebetween.

21. The mobile log skidder according to claim 15 wherein the trigger takes the form of a bar, one end of which is pivotally interconnected with one of the tongs by a universal joint, and the other end of which is releasably engageable with the other tong in such a way that the bar is disengageable from the other tong by a log interposed in the recess adjacent the mouth thereof.

* * * * *